United States Patent
Kim et al.

[11] Patent Number: 5,986,710
[45] Date of Patent: *Nov. 16, 1999

[54] IMAGE ENCODING METHOD AND APPARATUS FOR CONTROLLING THE NUMBER OF BITS GENERATED USING QUANTIZATION ACTIVITIES

[75] Inventors: Tae-Yong Kim, Taejeon; Jae-Kyoon Kim, Seoul; Kye-Ho Park, Suwon, all of Rep. of Korea

[73] Assignee: Samsung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/883,434

[22] Filed: Jun. 26, 1997

[30] Foreign Application Priority Data

Jun. 26, 1996 [KR] Rep. of Korea .................. 96-24164

[51] Int. Cl.$^6$ ........................................ H04N 7/32
[52] U.S. Cl. ........................ 348/405; 348/419; 348/420
[58] Field of Search .................. 348/384, 390, 348/400–403, 405, 407, 409–413, 415, 416, 419, 420, 699; 382/232, 236, 238, 248–251; H04N 7/133, 7/13, 77/32

[56] References Cited

U.S. PATENT DOCUMENTS

| | | | |
|---|---|---|---|
| 4,979,038 | 12/1990 | Guichard et al. | 358/133 |
| 5,073,821 | 12/1991 | Juri | 348/405 |
| 5,214,507 | 5/1993 | Aravind et al. | 348/415 |
| 5,305,115 | 4/1994 | Takahashi et al. | 348/409 |
| 5,317,397 | 5/1994 | Odaka et al. | 348/416 |
| 5,333,012 | 7/1994 | Singhal et al. | 348/405 |
| 5,440,345 | 8/1995 | Shimoda | 348/402 |
| 5,732,156 | 3/1998 | Watanabe et al. | 348/419 |

FOREIGN PATENT DOCUMENTS

| | | | |
|---|---|---|---|
| 0 399 487 A2 | 11/1990 | European Pat. Off. | H04N 7/133 |
| 0 435 163 A2 | 7/1991 | European Pat. Off. | G06F 15/64 |
| 5-227518 | 9/1993 | Japan . | |
| WO 88/10544 | 12/1988 | WIPO | H04N 7/137 |

Primary Examiner—Richard Lee
Attorney, Agent, or Firm—Sughrue, Mion, Zinn, Macpeak & Seas, PLLC

[57] ABSTRACT

An image encoding method and apparatus for controlling a bit generation quantity using a quantization activity accurately controls a bit generation quantity of an encoding frame. The image encoding apparatus includes a discrete cosine transformer for discrete-cosine-transforming a difference signal between an image signal of a current frame and an image signal of a restored previous frame in units of a block and outputting the transformation coefficients, a quantizer and a variable-length-encoder for quantizing and variable-length-encoding the transformation coefficients according to a quantization stepsize, respectively, a buffer memory for temporarily storing the variable-length-encoded data and transmitting the stored data at a constant bit rate, a quantization activity calculator portion for calculating quantization activities by counting the number of the quantization coefficients which are not zero among the quantization coefficients to which each quantization stepsizes is applied, a quantization controller for predicting a desired bit generation quantity via a fullness of a buffer memory and a transmission rate, and determining a quantization stepsize of the quantization activity to generate the closest bit generation quantity to the predicted bit generation quantity using a linear proportional relationship between the calculated quantization activity and the variable-length-encoded data generation quantity. Thus, an overflow and an underflow of a buffer memory can be surely prevented and a transmission channel can be effectively used.

20 Claims, 5 Drawing Sheets

FIG. 6A

| j | w(intra,j) | $t_1(j)$ | $t_2(j)$ | $t_3(j)$ | $t_4(j)$ | $t_5(j)$ | $t_6(j)$ | $t_7(j)$ | $t_8(j)$ | $t_9(j)$ | $t_{10}(j)$ | $t_{11}(j)$ | $t_{12}(j)$ | $t_{13}(j)$ | $t_{14}(j)$ | $t_{15}(j)$ | $t_{16}(j)$ | $t_{17}(j)$ | $t_{18}(j)$ | $t_{19}(j)$ | $t_{20}(j)$ |
|---|---|---|---|---|---|---|---|---|---|---|---|---|---|---|---|---|---|---|---|---|---|
| 1,2,4 | 16 | 0 | 1 | 2 | 3 | 4 | 5 | 6 | 7 | 8 | 9 | 10 | 11 | 12 | 13 | 14 | 15 | 16 | 17 | 18 | 19 |
| 3,5 | 19 | 1 | 2 | 3 | 4 | 5 | 7 | 8 | 9 | 10 | 11 | 13 | 14 | 15 | 16 | 17 | 18 | 20 | 21 | 22 | 23 |
| 6,7,8,9,10,11 | 22 | 1 | 2 | 4 | 5 | 6 | 8 | 9 | 10 | 12 | 13 | 15 | 16 | 17 | 19 | 20 | 21 | 23 | 24 | 26 | 27 |
| 13 | 24 | 1 | 2 | 4 | 5 | 7 | 8 | 10 | 11 | 13 | 14 | 16 | 17 | 19 | 20 | 22 | 23 | 25 | 26 | 28 | 29 |
| 12,14,18,19,20,21 | 26 | 1 | 3 | 4 | 6 | 8 | 9 | 11 | 12 | 14 | 15 | 16 | 18 | 20 | 21 | 23 | 25 | 26 | 29 | 30 | 32 |
| 15,16,17,22,23,24,34,35 | 27 | 1 | 3 | 5 | 6 | 8 | 10 | 11 | 13 | 15 | 16 | 18 | 19 | 20 | 21 | 23 | 25 | 26 | 28 | 30 | 33 |
| 25,26,27,31,32,33,36,37 | 29 | 1 | 3 | 5 | 7 | 9 | 10 | 12 | 14 | 16 | 17 | 18 | 19 | 21 | 23 | 25 | 27 | 28 | 30 | 32 | 34 |
| 38,39 | 32 | 1 | 3 | 5 | 7 | 9 | 11 | 13 | 15 | 17 | 19 | 21 | 23 | 25 | 27 | 29 | 31 | 33 | 35 | 37 | 39 |
| 28,29,30,40,41,47 | 34 | 2 | 4 | 6 | 8 | 10 | 12 | 14 | 16 | 19 | 21 | 23 | 25 | 27 | 29 | 31 | 33 | 36 | 38 | 40 | 42 |
| 45,46,48 | 35 | 2 | 4 | 6 | 8 | 10 | 13 | 15 | 17 | 19 | 21 | 24 | 26 | 28 | 30 | 32 | 34 | 37 | 39 | 41 | 43 |
| 42,44 | 37 | 2 | 4 | 6 | 9 | 11 | 13 | 16 | 18 | 19 | 23 | 25 | 27 | 30 | 32 | 34 | 36 | 39 | 41 | 43 | 46 |
| 43,49,50 | 38 | 2 | 4 | 7 | 9 | 11 | 14 | 16 | 18 | 20 | 23 | 26 | 28 | 30 | 33 | 35 | 37 | 40 | 42 | 45 | 47 |
| 51,52,53 | 40 | 2 | 4 | 7 | 9 | 12 | 14 | 17 | 19 | 21 | 24 | 27 | 29 | 32 | 34 | 37 | 39 | 42 | 44 | 47 | 49 |
| 56,57 | 46 | 2 | 5 | 8 | 11 | 14 | 17 | 20 | 22 | 25 | 28 | 31 | 34 | 37 | 40 | 43 | 45 | 48 | 51 | 54 | 57 |
| 54,55 | 48 | 2 | 5 | 8 | 11 | 14 | 17 | 20 | 23 | 26 | 29 | 32 | 35 | 38 | 41 | 44 | 47 | 50 | 53 | 56 | 59 |
| 58,59 | 56 | 3 | 6 | 10 | 13 | 17 | 20 | 24 | 27 | 31 | 34 | 38 | 41 | 45 | 48 | 52 | 55 | 59 | 62 | 66 | 69 |
| 60 | 58 | 3 | 7 | 10 | 14 | 18 | 21 | 25 | 28 | 32 | 36 | 39 | 43 | 47 | 50 | 54 | 57 | 61 | 65 | 68 | 72 |
| 61,62 | 69 | 4 | 8 | 12 | 17 | 21 | 25 | 30 | 34 | 38 | 43 | 47 | 51 | 56 | 60 | 64 | 68 | 73 | 77 | 81 | 86 |
| 63 | 83 | 5 | 10 | 15 | 20 | 25 | 31 | 36 | 41 | 46 | 51 | 57 | 62 | 67 | 72 | 77 | 82 | 88 | 93 | 98 | 103 |

FIG. 6B

| j | w(non-intra) | $t_1(j)$ | $t_2(j)$ | $t_3(j)$ | $t_4(j)$ | $t_5(j)$ | $t_6(j)$ | $t_7(j)$ | $t_8(j)$ | $t_9(j)$ | $t_{10}(j)$ | $t_{11}(j)$ | $t_{12}(j)$ | $t_{13}(j)$ | $t_{14}(j)$ | $t_{15}(j)$ | $t_{16}(j)$ | $t_{17}(j)$ | $t_{18}(j)$ | $t_{19}(j)$ | $t_{20}(j)$ |
|---|---|---|---|---|---|---|---|---|---|---|---|---|---|---|---|---|---|---|---|---|---|
| 1-63 | 16 | 1 | 3 | 5 | 7 | 9 | 11 | 13 | 15 | 17 | 19 | 21 | 23 | 25 | 27 | 29 | 31 | 33 | 35 | 37 | 39 |

IMAGE ENCODING METHOD AND APPARATUS FOR CONTROLLING THE NUMBER OF BITS GENERATED USING QUANTIZATION ACTIVITIES

BACKGROUND OF THE INVENTION

The present invention relates to an image encoding method and apparatus, and more particularly, to an image encoding method and apparatus for accurately controlling the number of bits generated with respect to image data encoded using quantization activities.

There have been recently proposed various methods for encoding video and audio signals into digital data to be transmitted or stored in a storage medium, and decoding the encoded digital data in order to reproduce the video and audio signals. International standardization is required for industrial use of an encoding and decoding system. As a result, standardization such as MPEG (Moving Picture Expert Group)-1 and MPEG-2 of ISO/IEC as well as H.261 of ITU-TS has been made. According to such standardization, a picture is divided into blocks each having an M(horizontal)×N(vertical) size and is encoded via discrete cosine transform (DCT), quantization, variable-length-coding, motion estimation and motion compensation encoding, and differential pulse coded modulation (DPCM) methods.

An apparatus for encoding data into the number of variable bits uses a buffer memory for outputting the encoded data at a constant bit rate. By the way, since the amount of the encoded data varies according to contents of images, it is difficult to accurately estimate the quantity of encoded data with respect to each frame. On the other hand, a buffer memory has a limited data capacity and a transmission channel has a limited bandwidth. As a result, problems have arisen that data is lost by an overflow of a buffer memory and an available transmission band is not sufficiently used by an underflow of the buffer memory. Thus, it is essential that the amount of encoded data is properly controlled in order to avoid data loss and sufficiently utilize an available transmission band.

Thus far, the amount of bits generated is controlled by adjusting a quantization stepsize according to a fullness of a buffer memory. That is, when the amount of data stored in a buffer memory is large, a quantization stepsize is made large in order to prevent an overflow of a buffer memory, thereby reducing the number of bits generated of the encoded data. When the amount of data stored in a buffer memory is small, a quantization stepsize is made small in order to prevent an underflow of a buffer memory, thereby increasing the number of bits generated of the encoded data.

In case when a change of a quantization stepsize relies slightly on a fullness of a buffer memory, an underflow and an overflow may frequently occur in the buffer memory due to indefinite change of the number of the generated bits according to the quantization stepsize. Once an overflow or an underflow occurs in a buffer memory, it takes long to remove such an occurrence. The data loss due to an overflow in a buffer memory may make it impossible to decode the lost data in a decoder. The underflow in a buffer memory makes a band utilization efficiency worse to thereby increase costs. On the contrary, in case when a quantization stepsize relies excessively on a fullness of a buffer memory, an overflow and an overflow may be prevented. However, since a quantization stepsize responds very sensitively to the fullness of a buffer memory, restoring the encoded data causes a picture quality to fluctuate.

Since the amount of the encoded data varies according to contents of an image, the amount of bits generated cannot be accurately controlled using a method of varying a quantization stepsize based on a fullness of a buffer memory. In other words, relationship between a quantization stepsize and a fullness of a buffer memory varies according to contents of an image, which cannot be established uniformly.

SUMMARY OF THE INVENTION

Thus, it is an object of the present invention to provide a method for accurately controlling the number of bits generated of an encoding frame by determining a quantization stepsize which can generate the number of bits of data to be encoded in a manner closest to a desired number of bits generated using quantization activities for reflecting contents of an input image so that an overflow and an underflow in a buffer memory can be prevented without relying upon only a fullness of the buffer memory.

It is another object of the present invention to provide an apparatus embodying the above image encoding method for controlling the number of bits generated using quantization activities.

To accomplish the above object of the present invention, there is provided an image encoding method for controlling the number of bits generated using quantization activities, in order to encode image data and transmitting the encoded image data via a buffer at a constant transmission rate, the image encoding method comprising the steps of:

(a) transforming the input image data in units of a block having a predetermined size and outputting transformation coefficients;

(b) calculating quantization activities corresponding to predetermined quantization stepsizes with respect to a predetermined data unit of the transformation coefficients output from the step (a);

(c) determining a quantization stepsize based on the quantization activities calculated in the step (b), the transmission rate and a fullness of the buffer; and (d) quantizing the transformation coefficients of the step (a) according to the quantization stepsize determined in the step) (c) and encoding the quantized transformation coefficients.

There is also provided an image encoding apparatus for controlling the number of bits generated using quantization activities, the image encoding apparatus comprising: a buffer portion for transmitting received data at a constant transmission rate; a transformation portion for transforming the received image data in units of a block having a predetermined size and outputting transformation coefficients; a quantization activity calculator portion for calculating quantization activities corresponding to predetermined quantization stepsizes with respect to a predetermined data unit of the transformation coefficients received from the transformation portion: a quantization controller for receiving the quantization activities calculated in the quantization activity calculator portion, the transmission rate and a fullness of the buffer portion and determining a quantization stepsize; and an encoding portion for quantizing the transformation coefficients according to the quantization stepsize determined in said quantization controller, for encoding and outputting the quantized transformation coefficients to said buffer portion.

BRIEF DESCRIPTION OF THE DRAWINGS

The preferred embodiment is described with reference to the drawings wherein:

FIGS. 6A and 6B show an example of a threshold value according to an intra code mode and a non-intra code mode in the lookup table of FIG. 3.

DETAILED DESCRIPTION OF PREFERRED EMBODIMENT

A preferred embodiment of the present invention will be described in detail with reference to the accompanying drawings.

Figure 1:
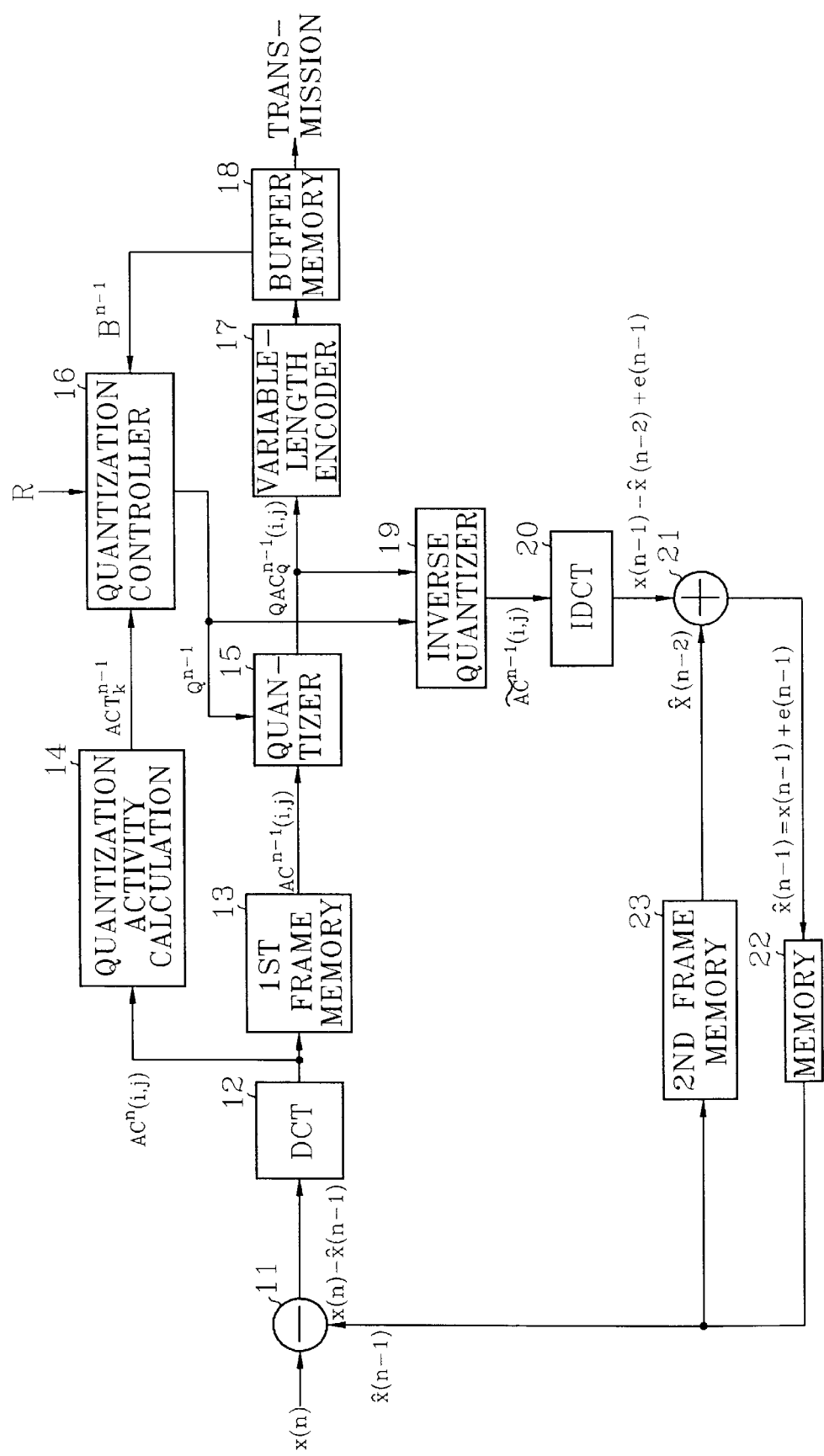
FIG. 1 is a block diagram showing an image encoding apparatus according to the present invention.

An image encoding apparatus of FIG. 1 includes a subtracter 11 for obtaining a difference signal between an image signal of a received current frame and that of a restored previous frame. A discrete cosine transformer (DCT) 12 receives the difference signal supplied from the subtracter 11 and discrete cosine-transforms the received difference signal in units of a block and outputs transformation coefficients. A first frame memory 13 receives the transformation coefficients output from the DCT 12 and delays the same by an interval of time corresponding to one frame. A quantization activity calculation unit 14 calculates quantization activities corresponding to quantization stepsizes with respect to a frames unit of the transformation coefficients delayed by the first frame memory 13. The quantization activity calculation unit 14 is shown in detail in FIGS. 2 and 3. The image encoding apparatus includes a quantizer 15 for receiving the transformation coefficients delayed by one frame in the first frame memory 13, a variable length-encoder 17 for variable-length-encoding the input quantized data to compress the input data into variable-length-encoded data, and a buffer memory 18 for transmitting the variable-length-encoded data at a constant transmission rate. A quantization controller 16 determines a quantization stepsize based on the quantization activities calculated in the quantization activity calculation unit 14, a fullness and the transmission rate of the buffer memory 18. The quantization controller 16 is shown in detail in FIG. 4. The quantization stepsize determined in the quantization controller 16 is input to a quantizer 15 and an inverse quantizer 19. The quantized data input to the variable-length-encoder 17 is input to an inverse quantizer 19. The inverse quantizer 19 inversely quantizes the quantized data and an inverse DCT (IDCT) 20 inversely discrete-cosine-transforms the inversely quantized data.

The image encoding apparatus includes a second frame memory 23 for storing image data of a previous frame to be restored, and an adder 21 for adding the data output from the IDCT 20 and the restored data of the previous frame input from the second frame memory 23. The image data output from the adder 21 which is the restored image data, is stored in a memory 22. The memory 22 outputs the restored image data of the stored previous frame to the subtracter 11 and the second frame memory 23.

In FIG. 1, the subtracter 11 subtracts the restored image signal $\hat{x}(n-1)$ of the input previous frame received from the memory 22 from the digital image signal $x(n)$ of the input current frame, and obtains a difference signal $x(n)-\hat{x}(n-1)$. The DCT 12 receives the difference signal $x(n)-\hat{x}(n-1)$ from the subtracter 11 and discrete-cosine-transforms the received difference signal in units of a block of a predetermined size, for example, a size composed of 8×8 pixels. The discrete cosine transformation is used to remove correlations between the pixels contained in an interframe difference signal. Since the transformation coefficients have a two-dimensional distribution of 8×8 pixels, the two-dimensional transformation coefficients are converted into one-dimension by zigzag scan in order to enhance an efficiency of variable-length-encoding. The transformation coefficient $AC^n(i,j)$ output from the DCT 12 represents a j-th transformation coefficient in the result of zigzag-scanning an i-th discrete-cosine-transformation block among the results obtained by discrete-cosine-transforming the interframe difference signal obtained based on the current frame $x(n)$. In case when at image of one frame is divided into M blocks each having 8×8 pixels, i has a value of 0, 1, . . . , M−1 and j represents the position of a transformation coefficient in the transformation coefficient block and has a value of 0, 1, . . . , 63. The transformation coefficient $AC^n(i,j)$ is input to the first frame memory 13 and the quantization activity calculation unit 14. During the time when the first frame memory 13 delays the input transformation coefficient $AC^n(i,j)$ by an interval of time corresponding to one frame, the quantization activity calculation unit 14 calculates quantization activities $ACT_k^n$ with respect to the quantization stepsize k which k=1, 2, . . . , or K from the transformation coefficient $AC^n(i,j)$, and outputs the calculated result to the quantization controller 16. Then, the transformation coefficient $AC^n(i,j)$ delayed by one frame in the first frame memory 13 is output to the quantizer 15. Here, K is the maximum value of a quantization stepsize which is supposed to be applied. In the case that K is 31, the 31 quantization activities $ACT_1^n$, $ACT_2^n$, . . . , and $ACT_{31}^n$ exist. The quantization activity $ACT_k^n$ is defined as the number of the quantized coefficients $QAC_k^n(i,j)$ which is not zero when the transformation coefficient $AC^n(i,j)$ is quantized using the quantization stepsize k. Here, only the AC component coefficients $AC^n(i,j)$ in which j=1, 2, . . . , or 63, are considered among the transformation coefficients. The quantization activity calculation unit 14 will be described later with reference to FIGS. 2 and 3.

The quantization controller 16 receives the quantization activity $ACT_k^{n-1}$ calculated in the quantization activity calculation unit 14, and a fullness $B^{n-1}$ and a transmission rate R of the buffer memory 18, and determines a quantization stepsize $Q^{n-1}$ to be applied to the transformation coefficient $AC^{n-1}(i,j)$ output from the first frame memory 13. The quantization controller 16 will be described later with reference to FIGS. 4 and 5. The quantization stepsize $Q^{n-1}$ determined in the quantization controller 16 is input to a quantizer 15 and an inverse quantizer 19. The quantizer 15 quantizes the transformation coefficients $AC^{n-1}(i,j)$ output from the first frame memory 13 according to the input quantization stepsize $Q^{n-1}$. The quantized coefficients $QAC_Q^{n-1}(i,j)$ are input to a variable length encoder 17 and the inverse quantizer 19. The variable length encoder 17 variable-length-encodes the input quantized coefficients $QAC_Q^{n-1}(i,j)$ based on a statistical characteristic to compress the input quantized coefficients $QAC_Q^{n-1}(i,j)$. The variable-length-encoded data is stored in a buffer memory 18 and the data stored in the buffer memory 18 is transmitted via a channel.

Meanwhile, the inverse quantizer 19 inversely quantizes the input quantization coefficients $QAC_Q^{n-1}(i,j)$ by an identical quantization stepsize $Q^{n-1}$ and the IDCT 20 inversely discrete-cosine-transforms the inversely quantization coefficients to be restored into a prior-to-being-transformed state. The DCT 12 and the IDCT 20 perform calculation with limited bits, and expresses the result into limited bits, during which time an error occurs. In addition, an error occurs in the quantizer 15. Thus, the inversely quantized and inversely-discrete-transformed image data x(n−1)−x̂ (n−2) $^1$e(n−1) output from the IDCT 20 differs from the image data x(n−1)−x̂ (n−2) input to the DCT 12. The adder 21 adds the output x̂ (n−2) output from the second frame memory 23 and the image data x(n−1)−x̂ (n−2)+e(n−1) output from the IDCT 20 thereby producing an image signal of a restored frame x̂ (n−1)=x(n−1)+e(n−1) with respect to the previous frame x(n−1). The memory 22 receives the image signal x̂ (n−1) of a frame produced in the adder 21, stores the received image signal therein, and outputs the stored image signal to the subtracter 11 when the image signal in units of a frame is input to the subtracter 11.

Figure 2:
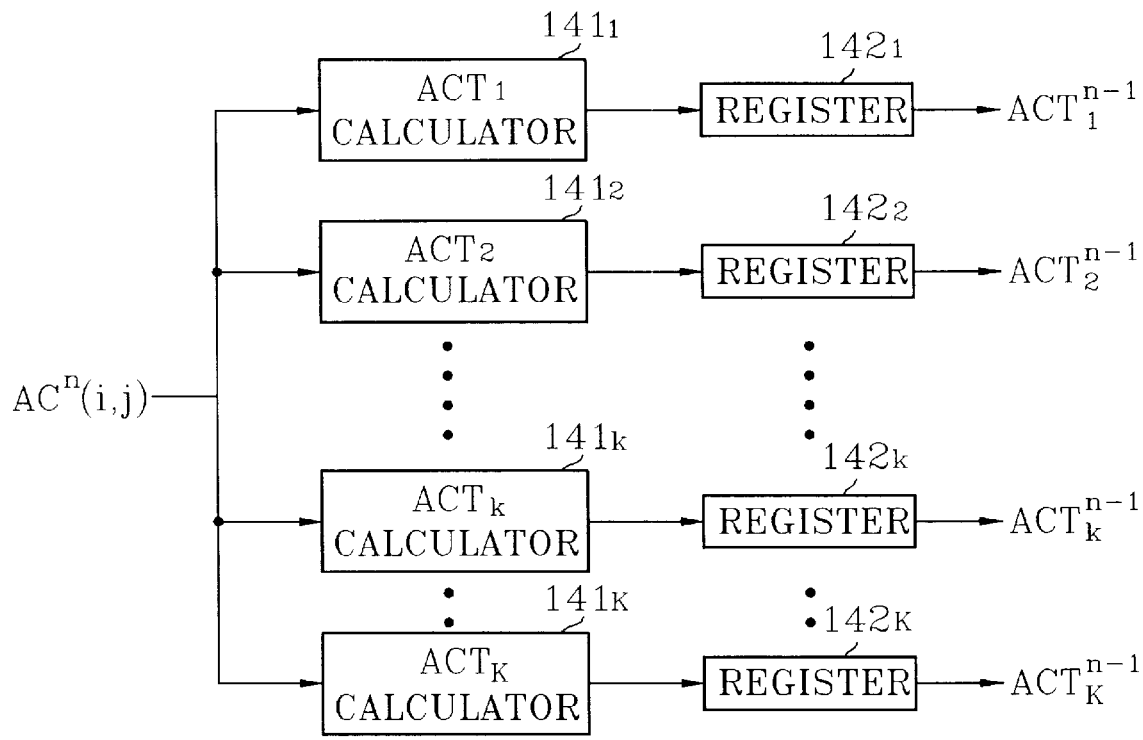
FIG. 2 is a detailed circuit diagram showing the quantization activity calculator portion of FIG. 1.

FIG. 2 is a detailed circuit diagram of the quantization activity calculation unit 14 of FIG. 1, which includes quantization activity calculators $141_1, 141_2, \ldots, 141_k, \ldots$, and $141_K$ for calculating the quantization activities $ACT_1 \sim ACT_K$ as many as the number corresponding to the maximum value K of the quantization stepsize and registers $142_1, 142_2, \ldots, 142_k, \ldots$, and $142_K$ corresponding to the quantization activity calculators $141_1, 141_2, \ldots, 141_k, \ldots, 141_K$.

In FIG. 2, the quantization activity calculation unit 14 receives the transformation coefficients $AC^n(i,j)$ output from the DCT 12. The quantization activity calculators $141_1, 141_2, \ldots, 141_k, \ldots, 141_K$ which correspond to the quantization stepsizes on a one-to-one basis calculate the quantization activities in the case when the respectively input transformation coefficients $AC^n(i,j)$ are quantized into a corresponding, quantization stepsize. The respective quantization activities $ACT_1^n, ACT_2^n, \ldots, ACT_k^n, \ldots$, and $ACT_K^n$, calculated by the quantization activity calculators are output to the corresponding registers $142_1, 142_2, \ldots, 142_k, \ldots, 142_K$. The registers store the input quantization activities, and output the stored quantization activities $ACT_1^{n-1}, ACT_2^{n-1}, \ldots, ACT_k^{n-1}, \ldots$, and $ACT_K^{n-1}$ to the quantization controller 16. The quantization activity calculators $141_1, 141_2, \ldots, 141_k, \ldots$, or $141_K$ will be described in detail with reference to FIG. 3.

Figure 3:
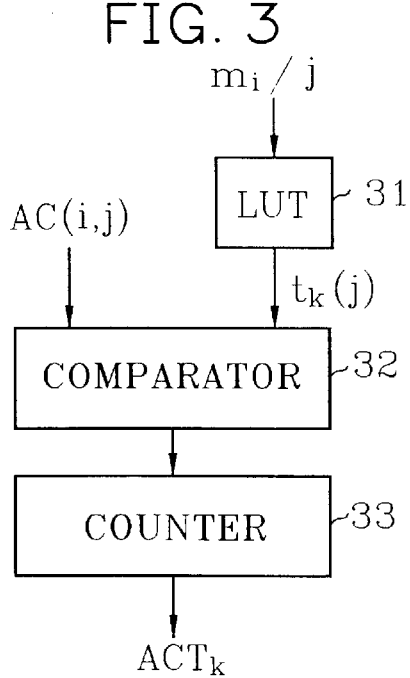
FIG. 3 is a detailed circuit diagram showing the quantization activity calculator of FIG. 2.

FIG. 3 is a detailed circuit diagram showing the quantization activity ($ACT_k$) calculator corresponding to the quantization stepsize k. The quantization activity $ACT_k$ is defined as the number of the quantization coefficient $QAC_k^{n-1}(i,j)$ which is not zero when the transformation coefficient is quantized into the quantization stepsize k. The quantization activity $ACT_k$ is defined by the following equation (1) when an image of one frame is divided into M blocks each having 8×8 pixels.

$$ACT_k = \sum_{i=0}^{M-1} \sum_{j=1}^{63} 1_k(i, j) \tag{1}$$

Here, $1_k(i,j)$ represents whether the quantization coefficient $QAC_k(i,j)$ is zero or not, which is defined by the following equation (2).

$$1_k(i, j) = \begin{cases} 0, & \text{if } QAC_k(i, j) = 0 \\ 1, & \text{if } QAC_k(i, j) \neq 0 \end{cases} \tag{2}$$

When the quantized coefficient is variable-length encoded using a single codeword composed of a pair of [run, level], the quantization activities defined by the equation (1) becomes the number of the codewords. Thus, the number of bits generated after variable-length-encoding is linearly proportional to the quantization activity of the above equation (1). Using the above linear proportional relationship, the number of bits generated are predicted and controlled.

In FIG. 3, the input transformation coefficient AC(i,j) is input to a comparator 32 in order to calculate the quantization activity defined as described above. The transformation coefficient AC(i,j) has an integer value within a specific range. The comparator 32 also receives a threshold value $t_k(i,j)$ from a lookup table LUT 31. Here, the threshold value $t_k(i,j)$ is the largest value among the transformation coefficients AC(i,j) in which the quantization coefficients $QAC_k(i,j)$ become zero when the j-th transformation coefficient AC(i,j) among 64 transformation coefficients is quantized with a quantization stepsize k. The comparator 32 compares the value of the input transformation coefficient AC(i,j) with the threshold value $t_k(i,j)$. The comparator 32 outputs a binary signal "1" to a counter 33 if the transformation coefficient is larger than the threshold value and outputs a binary signal "0" to the counter 33 if the former is smaller than or equal to the latter. The counter 33 resets a count value as "0" whenever every frame starts. The counter 33 counts the number of times when the binary signal output from the comparator 32 is "1." The counter 33 outputs the count value with respect to the whole one frame as the quantization activity $ACT_k$ with respect to the quantization stepsize k. The other quantization activities with respect to the other quantization stepsizes are calculated in the same way as the above.

For example, the quantization activity can be calculated in MPEG-1 as follows. In MPEG-1, transformed blocks are encoded into one between two code modes of an intra code mode and a non-intra code mode. In case of an intra code mode, the transformation coefficients of the AC components are quantized according to the following equation (3), while in case of a non-intra code mode, they are quantized according to the following equation (4).

$$QAC_q(i,j)=8 \times AC(i,j)//(Q \times w(m_i=\text{intra},j)) \tag{3}$$

$$QAC_Q(i,j)=8 \times AC(i,j)/(Q \times w(m_i=\text{non-intra},j)) \tag{4}$$

Here, the symbol "//" is an operator which rounds to the nearest whole number of the result of a division operation to make it into an integer, and the other symbol "/" which discards the decimal places from the result of the division operation to make it into an integer. Also, w($m_i$=intra,j) and w($m_i$ non-intra,j) are weight values reflecting a visual characteristic possessed by each transformation coefficient in order to enhance a subjective quality of picture. The character $m_i$ is a code mode of the i-th block.

The threshold value $t_q(j)$ in which Q=1, 2, ..., 31 and j=1, 2, ..., 63 can be easily obtained by the above equations (3) and (4). In the MPEG-1, the threshold values with respect to the weight values w($m_i$=intra,j) and w($m_i$=non-intra,j) of each code mode are same as the FIGS. 6A and 6B Tables.

FIGS. 6A and 6B show an example of threshold values in the lookup table 31 of FIG. 3 according to an intra code mode and a non-intra code mode in which the threshold value $t_Q(j)$ in which j=1, 2, ..., 63 is calculated with respect to only the quantization stepsize Q from 1 to 20.

Referring to FIG. 6A, nineteen (19) weight values exist with respect to an intra code mode. Referring to FIG. 6B, the same weight value of "16" is assigned irrespective of the position with respect to the non-intra code mode. Thus, the LUT 31 outputs, among the threshold values according to the quantization stepsize, a threshold value obtained by combining the input code mode $m_i$ and the position (j) of the transformation coefficient to the comparator 32. In the case other than the MPEG-1, the threshold value is calculated in the same way as the above to form a lookup table.

Figure 4:
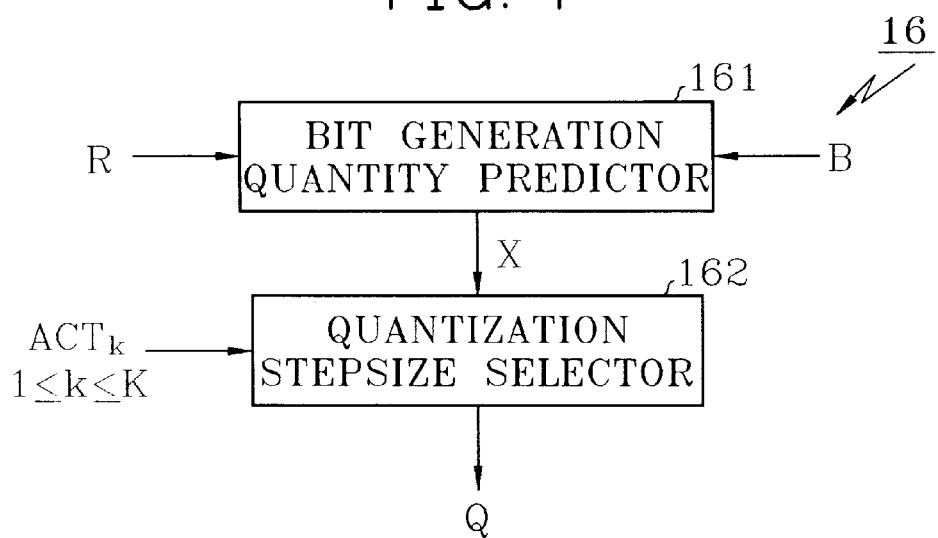
FIG. 4 is a detailed circuit diagram showing the quantization controller of FIG. 1.

FIG. 4 is a detailed circuit diagram showing the quantization controller 16 of FIG. 1. The quantization controller 16 includes a bit generation quantity predictor 161 for receiving a fullness B and a transmission rate R of the buffer memory 18 and predicting a bit generation quantity X, and a quantization stepsize selector 162 for receiving quantization activities from the quantization activity calculation unit 14 and selecting quantization stepsize which can generate the closest quantity of bits to the bit generation quantity X predicted by the bit generation quantity predictor 161.

In FIG. 4, the bit generation quantity predictor 161 of the quantization controller 16 predicts a desired bit generation quantity X from a current frame using a fullness B of the buffer memory 18 and a channel transmission rate R. The predicted bit generation quantity X is input to the quantization stepsize selector 162. The quantization stepsize selector 162 selects a quantization stepsize Q which can generate a predicted bit generation quantity X from a current frame using the quantization activity $ACT_k$ (in which $1 \leq k \leq K$) calculated in the quantization activity calculation unit 14. The quantization stepsize selector 162 will be described in detail with reference to FIG. 5.

Figure 5:
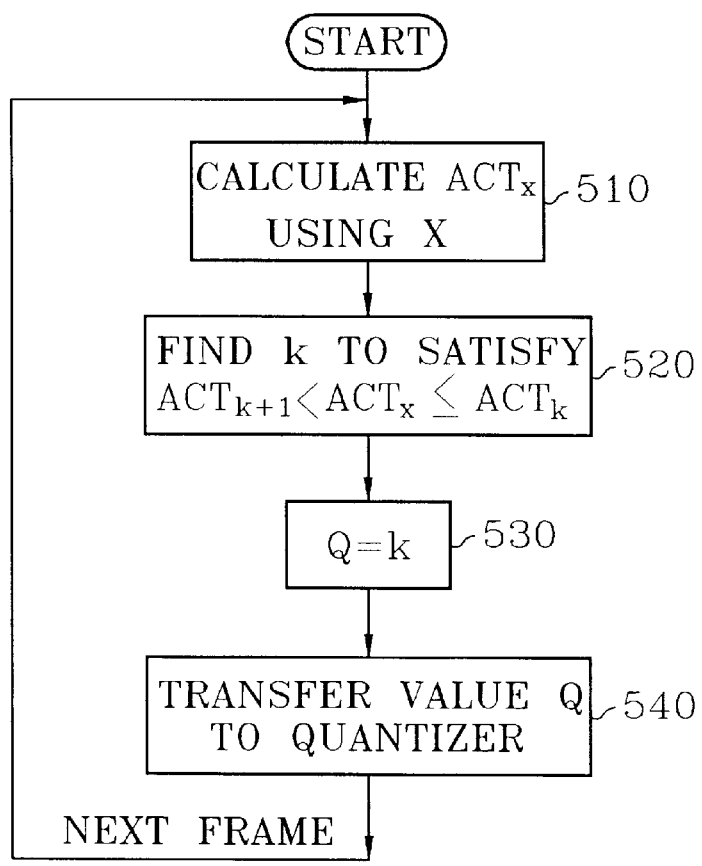
FIG. 5 is a flow-chart diagram for explaining the operation with respect to the quantization stepsize selector of FIG. 4.

FIG. 5 is a flow-chart diagram for explaining the operation with respect to the quantization stepsize selector 162 of FIG. 4.

In FIG. 5, the quantization stepsize selector 162 calculates a quantization activity $ACT_x$ for generating from a current frame a bit generation quantity X predicted by the bit generation quantity predictor 161, based on the following equation (5) (step 510).

$$ACT_x = mX + n \qquad (5)$$

The above equation (5) specifically represents a linear proportional relationship between the quantization activity and the bit generation quantity as described above, which is a bit generation prediction model. Here, m and n are constant and can vary according to a code mode and are determined via an experiment. The MPEG-1 has three patterns of I-frame, P-frame and B-frame according to the code mode and has the following generation prediction model via an experiment.

In case of I-frame, ACT=0.165X.
In case of P-frame, ACT=0.150X
In case of B-frame, ACT=0.150X−1000

Here, ACT is a quantization activity irrespective of a quantization stepsize.

For example, if a desired bit generation quantity X is 150,000 bits in a certain I-frame, the quantization activity $ACT_x$ to be obtained by applying a quantization coefficient to a transformation coefficient becomes 24,750 bits (0.165× 150,000).

When the quantization activity $ACT_x$ is calculated using the bit generation prediction model in step 510, the quantization stepsize selector 162 compares the quantization activity $ACT_x$ with the quantization activity according to each quantization stepsize calculated in the quantization activity calculation unit 14, and finds the quantization stepsize "k" satisfying the following condition (step 520).

$$ACT_{k-1} < ACT_x \leq ACT_k \qquad (6)$$

Generally, the value of the quantization activity in which a larger value of the quantization stepsize is applied with respect to the transformation coefficient is always smaller than or equal to that in which a smaller value of the quantization stepsize is applied with respect to the transformation coefficient. Thus, the quantization stepsize selector 162 finally selects the quantization stepsize k as the quantization stepsize Q of the current frame, when the quantization activity $ACT_x$ calculated using the bit generation prediction model is greater than that of the quantization stepsize k+1, and smaller than or equal to that of the quantization stepsize k (step 530). Here, if the quantization stepsize is k, the bits which are closest to or equal to a desired bit generation quantity X can be generated. The quantization stepsize selector 162 transfers the selected quantization stepsize Q to the quantizer 15 and the inverse quantizer 19 of FIG. 1 (step 540). The quantization stepsize with respect to an input image signal of the next frame is also selected by performing the processes starting from step 510.

As described above, the image encoding method and apparatus for controlling a bit generation quantity using a quantization activity, calculates the quantization activity corresponding to a quantization stepsize from transformation coefficients, and predicts a desired bit generation quantity for each frame, to thereby control a bit generation quantity of the data encoded into a quantization stepsize of the quantization activity which can generate a predicted bit generation quantity. Thus, an overflow and an underflow of a buffer memory can be certainly prevented and a transmission channel can be effectively used.

While only certain embodiments of the invention have been specifically described herein, it will be apparent that numerous modifications may be made thereto without departing from the spirit and scope of the invention.

What is claimed is:

1. An image encoding method for encoding input image data and transmitting the encoded image data via a buffer at a constant transmission rate, the image encoding method comprising the steps of:

(a) transforming the input image data in units of a block having a predetermined size and outputting transformation coefficients;

(b) calculating first quantization activities corresponding to predetermined quantization stepsizes with respect to a predetermined data unit of the transformation coefficients output from said step (a);

(c) determining a quantization stepsize based on the first quantization activities calculated in said step (b), the transmission rate and a fullness of the buffer; and (d) quantizing the transformation coefficients of said step (a) according to the quantization stepsize determined in said step (c) and encoding the quantized transformation coefficients, wherein said step (b) comprises the sub-steps of:

(b1) comparing the transformation coefficients with a pre-set threshold value to produce a comparison result; and (b2) counting a number of the transformation coefficients larger than the threshold value in units of a frame according to the comparison result of said sub-step (b1) to output one of said first quantization activities.

2. The image encoding method according to claim 1, wherein in said step (a) a one-frame image data is input.

3. The image encoding method according to claim 1, wherein in said step (a) said input image data represents a difference between two adjacent image frames.

4. The image encoding method according to claim 1, wherein each of said first quantization activities is the number of quantization coefficients which are not zero when said transformation coefficients are quantized into each of said quantization stepsizes.

5. The image encoding method according to claim 4, wherein in said step (b) each of said first quantization activities is calculated based on the following equation when the input image data is divided into M blocks each having a size of m×n pixels:

$$ACT_k = \sum_{i=0}^{M-1} \sum_{j=1}^{N-1} I_k(i, j)$$

wherein $ACT_k$ represents one of said first quantization activities corresponding to one of quantization stepsizes k=(1, 2, . . . , K); i represents the position of a block; j represents a position of one of said transformation coefficients, corresponding to an AC component in the block; N represents m×n; $I_k$ represents 0 if one of said quantization coefficients is 0 and 1 if one of said quantization coefficients is not 0, when one of said transformation coefficients is quantized into one of said quantization stepsizes k.

6. The image encoding method according to claim 5, wherein each of said first quantization activities is linearly proportional to a bit generation quantity of variable-length-encoded data.

7. The image encoding method according to claim 1, wherein said step (c) comprises the sub-steps of:
 (c1) predicting a bit generation quantity with respect to the predetermined data unit based on the transmission rate and the fullness of the buffer; and
 (c2) determining the quantization stepsize using the first quantization activities calculated in said step (b) and the bit generation quantity predicted in said sub-step (c1).

8. An image encoding method for encoding input image data and transmitting the encoded image data via a buffer at a constant transmission rate, the image encoding method comprising the steps of:
 (a) transforming the input image data in units of a block having a predetermined size and outputting transformation coefficients;
 (b) calculating first quantization activities corresponding to predetermined quantization stepsizes with respect to a predetermined data unit of the transformation coefficients output from said step (a);
 (c) determining a quantization stepsize based on the first quantization activities calculated in said step (b), the transmission rate and a fullness of the buffer; and
 (d) quantizing the transformation coefficients of said step (a) according to the quantization stepsize determined in said step (c) and encoding the quantized transformation coefficients;
 wherein each of said first quantization activities is the number of quantization coefficients which are not zero when said transformation coefficients are quantized into the quantization stepsize;
 wherein in said step (b) each of said first quantization activities is calculated based on the following equation when the input image data is divided into M blocks each having a size of m×n pixels;

$$ACT_k = \sum_{i=0}^{M-1} \sum_{j=1}^{N-1} I_k(i, j)$$

wherein $ACT_k$ represents one of said first quantization activities corresponding to one of a plurality of quantization stepsizes, where each of said plurality of quantization stepsizes is associated with a value of k=(1, 2, . . . , K); i represents the position of a block; j represents a position of one of said transformation coefficients, corresponding to an AC component in the block; N represents m×n; $I_k$ represents 0 if one of said quantized transformation coefficients is 0 and 1 if one of said quantized transformation coefficients is not 0, when one of said transformation coefficients is quantized into quantization stepsize k;
 wherein each of said first quantization activities is linearly proportional to a bit generation quantity of variable-length-encoded data; and
 wherein said step (b) comprises the sub-steps of:
  (b1) comparing the transformation coefficients with a pre-set threshold value to produce a comparison result; and
  (b2) counting a number of the transformation coefficients larger than the threshold value in units of a frame according to the comparison result of said sub-step (b1) to output one of said first quantization activities.

9. The image encoding method according to claim 8, wherein said threshold value is discriminatively set as the maximum value of a transformation coefficient in which a quantization coefficient is zero with respect to each quantization stepsize among values of the transformation coefficients corresponding to a block-unit AC component, according to one of an intra code mode and a non-intra code mode.

10. An image encoding method for encoding input image data and transmitting the encoded image data via a buffer at a constant transmission rate, the image encoding method comprising the steps of:
 (a) transforming the input image data in units of a block having a predetermined size and outputting transformation coefficients;
 (b) calculating first quantization activities corresponding to predetermined quantization stepsizes with respect to a predetermined data unit of the transformation coefficients output from said step (a);
 (c) determining a quantization stepsize based on the first quantization activities calculated in said step (b), the transmission rate and a fullness of the buffer; and
 (d) quantizing the transformation coefficients of said step (a) according to the quantization stepsize determined in said step (c) and encoding the quantized transformation coefficients;
 wherein said step (c) comprises the sub-steps of:
  (c1) predicting a bit generation quantity with respect to the predetermined data unit based on the transmission rate and the fullness of the buffer; and
  (c2) determining the quantization stepsize using the first quantization activities calculated in said step (b) and the bit generation quantity predicted in said sub-step (c1); and
 wherein said sub-step (c2) comprises the sub-steps of:
  (c2a) calculating a second quantization activity for generating the bit generation quantity predicted in sub-step (c1) in units of the predetermined data unit; and (c2b) comparing the second quantization activity calculated in sub-step (c2a) with the first quantization activities calculated in said step (b), and determining the quantization stepsize based on the comparison result.

11. The image encoding method according to claim 10, wherein said sub-step (c2a) calculates the second quantization activity for generating the predicted bit generation quantity based on the following equation:

$$ACT_x = aX + b,$$

wherein $ACT_x$ is the second quantization activity; X is the predicted bit generation quantity; and a and b are constants.

12. The image encoding method according to claim 11, wherein said sub step (c2b) compares the second quantization activity calculated in said sub-step (c2a) with the first quantization activities calculated in said step (b) and determines the quantization stepsize of the second quantization activity satisfying the following condition:

$$ACT_{k+1} < ACT_x \leq ACT_k,$$

wherein $ACT_x$ is the second quantization activity calculated in said sub-step (c2a); $ACT_k$ is one of said first quantization activities calculated in said step (b) which corresponds to the quantization stepsize k; $ACT_{k+1}$ is one of said first quantization activities calculated in said step (b) which corresponds to the quantization stepsize k+1; and k is the quantization stepsize being determined.

13. An image encoding apparatus comprising:
a buffer portion for transmitting received image data at a constant transmission rate;
a transformation portion for transforming the received image data in units of a block having a predetermined size and outputting transformation coefficients;
a quantization activity calculator portion for calculating quantization activities corresponding to predetermined quantization stepsizes with respect to a predetermined data unit of the transformation coefficients received from said transformation portion, said quantization activity calculator portion including a comparator for comparing ones of the transformation coefficients with a threshold value and outputting a comparison result, and a counter for counting the number of the transformation coefficients larger than the threshold value in units of a frame according to the comparison result to output the count result as the quantization activity;
a quantization controller for receiving the quantization activities calculated in said quantization activity calculator portion, the transmission rate and a fullness of said buffer portion and determining a quantization stepsize; and
an encoding portion for quantizing the transformation coefficients according to the quantization stepsize determined in said quantization controller, for encoding and outputting the quantized transformation coefficients to said buffer portion.

14. The image encoding apparatus according to claim 13, wherein each of said quantization activities is the number of the quantization coefficients which are not zero when said transformation coefficients of one frame are quantized into each of said predetermined quantization stepsizes.

15. The image encoding apparatus according to claim 14, wherein said quantization activity calculator portion comprises:

quantization activity calculators for receiving the transformation coefficients and calculating each of said quantization activities in units of a frame with respect to each of said predetermined quantization stepsizes; and registers coupled in correspondence to said quantization activity calculators, for storing the calculated quantization activity, and outputting the stored quantization activity to said quantization controller.

16. The image encoding apparatus according to claim 13, wherein said quantization controller determines said quantization stepsize using a linear proportional relationship between the quantization activity and a bit generation quantity.

17. The image encoding apparatus according to claim 13, further comprising a memory for storing the transformation coefficients of said transformation portion during a time when said quantization activity calculator portion calculates the quantization activities.

18. An image encoding apparatus comprising:
a buffer portion for transmitting received image data at a constant transmission rate;
a transformation portion for transforming the received image data in units of a block having a predetermined size and outputting transformation coefficients;
a quantization activity calculator portion for calculating quantization activities corresponding to predetermined quantization stepsizes with respect to a predetermined data unit of the transformation coefficients received from said transformation portion;
a quantization controller for receiving the quantization activities calculated in said quantization activity calculator portion, the transmission rate and a fullness of said buffer portion and determining a quantization stepsize; and
an encoding portion for quantizing the transformation coefficients according to the quantization stepsize determined in said quantization controller, for encoding and outputting the quantized transformation coefficients to said buffer portion;
wherein each of said quantization activities is the number of the quantization coefficients which are not zero when said transformation coefficients of one frame are quantized into each of said predetermined quantization stepsizes;
wherein said quantization activity calculator portion comprises:
    quantization activity calculators for receiving the transformation coefficients and calculating each of said quantization activities in units of a frame with respect to each of said predetermined quantization stepsizes; and
    registers coupled in correspondence to said quantization activity calculators, for storing the calculated quantization activity, and outputting the stored quantization activity to said quantization controller; and
    wherein each of said quantization activity calculators comprises:
        a lookup table for storing a maximum value among values in which each of said quantized transformation coefficients is zero with respect to each of said transformation coefficients as a threshold value, and outputting the threshold value corresponding to a portion obtained by combining an intra and a non-intra block-unit code mode and the position of the transformation coefficient;

a comparator for comparing the input transformation coefficient with the threshold value and outputting a comparison result; and a counter for counting the number of the transformation coefficients larger than the threshold value in units of a frame according to the comparison result to output the count result as the quantization activity.

19. An image encoding apparatus comprising:

a buffer portion for transmitting received image data at a constant transmission rate;

a transformation portion for transforming the received image data in units of a block having a predetermined size and outputting transformation coefficients;

a quantization activity calculator portion for calculating quantization activities corresponding to predetermined quantization stepsizes with respect to a predetermined data unit of the transformation coefficients received from said transformation portion;

a quantization controller for receiving the quantization activities calculated in said quantization activity calculator portion, the transmission rate and a fullness of said buffer portion and determining a quantization stepsize; and an encoding portion for quantizing the transformation coefficients according to the quantization stepsize determined in said quantization controller, for encoding and outputting the quantized transformation coefficients to said buffer portion;

wherein said quantization controller determines said quantization stepsize using a linear proportional relationship between the quantization activity and a bit generation quantity; and wherein said quantization controller comprises:

a predictor for predicting the bit generation quantity with respect to the current frame based on the transmission rate and the fullness of said buffer portion; and a quantization stepsize selector for calculating the quantization activity using the predicted bit generation quantity, comparing the calculated quantization activity with the quantization activities calculated in said quantization activity calculator portion, and selecting the quantization stepsize for generating the predicted bit generation quantity.

20. The image encoding apparatus according to claim 19, wherein said quantization stepsize selector finally selects the quantization stepsize corresponding to one of the quantization activities calculated in the quantization activity calculator portion, wherein said one of the quantization activities is larger than or equal to the quantization activity calculated in said quantization stepsize selector.

* * * * *